(12) United States Patent
Ishizaka

(10) Patent No.: US 9,277,095 B2
(45) Date of Patent: Mar. 1, 2016

(54) DISTRIBUTION EVALUATION APPARATUS AND METHOD, DISTRIBUTION DETERMINING APPARATUS AND METHOD, IMAGE PROCESSING APPARATUS AND METHOD, AND COMPUTER READABLE MEDIUM

(75) Inventor: Kanya Ishizaka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 629 days.

(21) Appl. No.: 13/465,106

(22) Filed: May 7, 2012

(65) Prior Publication Data

US 2013/0136368 A1     May 30, 2013

(30) Foreign Application Priority Data

Nov. 24, 2011    (JP) ................................. 2011-256085

(51) Int. Cl.
| | |
|---|---|
| G06K 9/00 | (2006.01) |
| G06K 9/46 | (2006.01) |
| G06K 9/66 | (2006.01) |
| G06K 9/50 | (2006.01) |
| H04N 1/405 | (2006.01) |
| H04N 1/409 | (2006.01) |
| G06K 9/62 | (2006.01) |

(52) U.S. Cl.
CPC ............. *H04N 1/405* (2013.01); *H04N 1/4092* (2013.01); *G06K 9/6212* (2013.01)

(58) Field of Classification Search
None
See application file for complete search history.

(56) References Cited

U.S. PATENT DOCUMENTS

| | | | | |
|---|---|---|---|---|
| 8,744,212 | B2 * | 6/2014 | Ishizaka | 382/283 |
| 2013/0308861 | A1 * | 11/2013 | Cordara et al. | 382/170 |

FOREIGN PATENT DOCUMENTS

| | | |
|---|---|---|
| JP | 2007-159933 A | 6/2007 |
| JP | 2007-189427 A | 7/2007 |

OTHER PUBLICATIONS

Communication dated Aug. 5, 2015 from the Japanese Patent Office in counterpart application No. 2011-256085.

\* cited by examiner

*Primary Examiner* — Matthew Bella
*Assistant Examiner* — Jose M Torres
(74) *Attorney, Agent, or Firm* — Sughrue Mion, PLLC

(57) ABSTRACT

A distribution evaluation apparatus includes an evaluation value calculating unit that calculates weighted energy, as an evaluation value representing distribution of located objects x and y, by calculating a product resulting from multiplying weighting function values $\omega(x)$ and $\omega(y)$ and probability density function values $\phi(x)$ and $\phi(y)$ representing densities or sizes of the located objects x and y, by a mutual influence value determined by a function fr having as a variable a distance between the located objects x and y, and then by summing the resulting products with respect to all the located objects x and y into the weighted energy, and an evaluating unit that evaluates the distribution of the located objects in accordance with the evaluation value calculated by the evaluation value calculating unit.

20 Claims, 20 Drawing Sheets

200×200 PIXELS

DISTRIBUTION EVALUATION APPARATUS AND METHOD, DISTRIBUTION DETERMINING APPARATUS AND METHOD, IMAGE PROCESSING APPARATUS AND METHOD, AND COMPUTER READABLE MEDIUM

CROSS-REFERENCE TO RELATED APPLICATIONS

This application is based on and claims priority under 35 USC 119 from Japanese Patent Application No. 2011-256085 filed Nov. 24, 2011.

BACKGROUND (i) Technical Field

The present invention relates to distribution evaluation apparatus, distribution evaluation method, distribution determining apparatus, distribution determining method, image processing apparatus, image processing apparatus method, and computer readable medium.

SUMMARY

According to an aspect of the invention, a distribution evaluation apparatus is provided. The distribution evaluation apparatus includes an evaluation value calculating unit that calculates weighted energy, as an evaluation value representing distribution of two located objects x and y, by calculating a product resulting from multiplying weighting function values ω(x) and ω(y) and probability density function values φ(x) and φ(y) representing densities or sizes of the located objects x and y, by a mutual influence value determined by a function fr having as a variable a distance between the located objects x and y, and then by summing the resulting products with respect to all the located objects x and y into the weighted energy, and an evaluating unit that evaluates the distribution of the located objects in accordance with the evaluation value calculated by the evaluation value calculating unit.

BRIEF DESCRIPTION OF THE DRAWINGS

Exemplary embodiments of the present invention will be described in detail based on the following figures, wherein.

DETAILED DESCRIPTION

Figure 1:
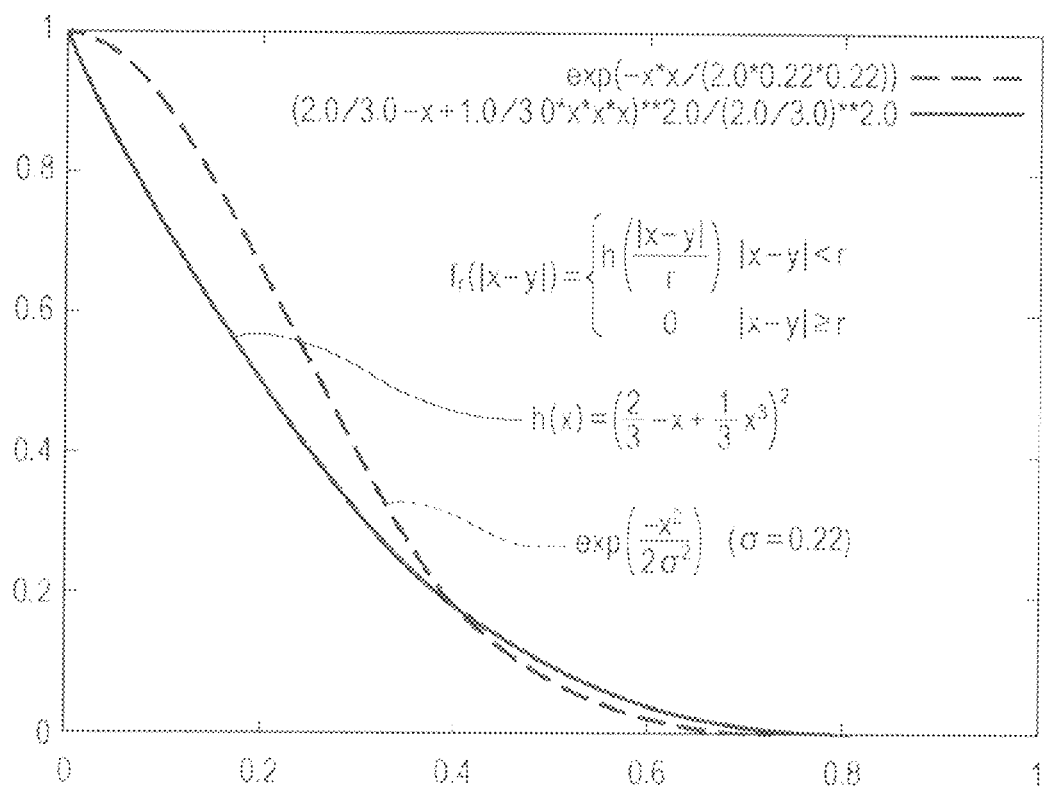
FIG. 1 is a graph of an example of a function fr defining a mutual influence value.
Figure 2:
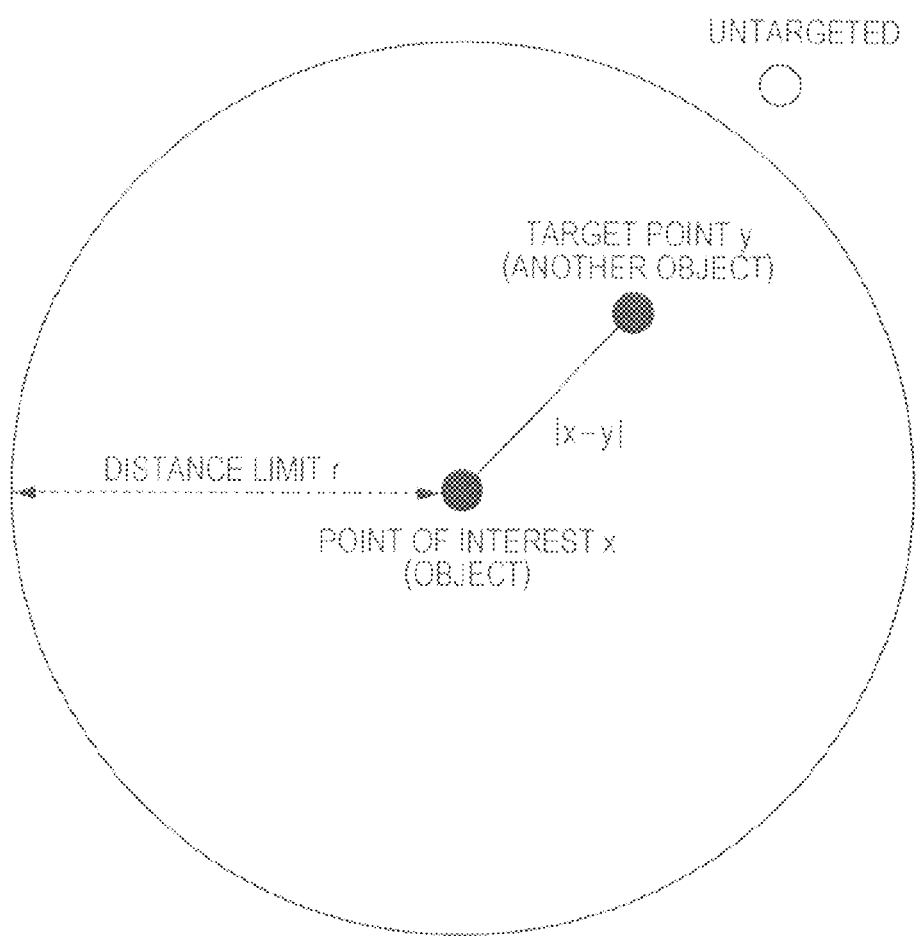
FIG. 2 illustrates a distance limit r set for the function fr defining the mutual influence value.

For understanding the present invention, it will be useful to describe the background and summary of the present invention first.

A technical demand commonly felt in the field of digital image processing techniques is to perform a predetermined process on a provided original image without adversely affecting an image quality of the image in vision.

One of such technical demands includes reducing an amount of data and a color count with an image maintained sufficiently close in vision to an original image in each of a lossless compression technique, a color decreasing technique, and a digital halftoning technique that is a special case of the color decreasing technique. In the evaluation of the performance of the image processing technique, one demand is to evaluate the degree of discrepancy between an original image and an "image resulting from processing." These demands have been typically and separately addressed in fields of image processing, and no general and consistent concept has been established across the fields.

Japanese Unexamined Patent Application Publication No. 2007-189427 discloses a method of addressing such a demand in a dispersed-dot halftoning technique in the digital halftoning technique field. More specifically, in one disclosed method, a binary image restoring an original image is obtained by defining energy that results from multiplying an inverse number of a density determined from the original image (an inverse number of a pixel value of the original image), and by decreasing the energy of any binary image. In another method, a discrepancy between any binary image and an original image is evaluated according to energy.

The dispersed-dot halftoning technique in the digital halftoning technique field disclosed in Japanese Unexamined Patent Application Publication No. 2007-189427 addresses the commonly felt demands, including the demand that allows the predetermined process to be performed without adversely affecting the given original image in vision, and the demand that allows the discrepancy from the original image to be evaluated. However, in the other fields, these demands are not addressed. It is thus desirable to address the typical demand consistently and universally and to provide a plurality of useful features in the image processing technical field. More generally, it is desirable to acquire a distribution of located objects different in density and size, the distribution faithfully satisfying a given density distribution.

A distribution determining apparatus of one exemplary embodiment of the present invention is described below. Before discussing a distribution evaluation process and a distribution determination process of the distribution determining apparatus, the definition of weighted energy and energy decreasing as concepts underlying the processes are described first.

Definition of Weighted Energy

According to the exemplary embodiment, a concept of weighted energy serves as a measure of evaluation of distribution. A mutual influence value and a weighted potential are defined as below, followed by the discussion of the definition of weighted energy.

The distribution determining apparatus of the exemplary embodiment acts in a compact metric space X. Here, the following discussion is based on the premise that distance $|x-y|$ between two points $x \in X$ and $y \in X$ is defined in the space X in uniformity. The word "uniformity" refers to the fact that all points within a distance r from any point x belongs to the space X. A two-dimensional rectangle X may now be considered. As for the surrounding of the rectangle, distance $|x-y|$ is defined as a surrounding environment. More specifically, X represents a space where the left side is connected to the right side in the rectangle, and the upper side is connected to the lower side in the rectangle. The shortest distance from point x to point y is defined as $|x-y|$. (If an ordinary distance in the space X is used without defining the distance, no uniformity is established along the upper and lower sides, and the left and right sides). Let x represent a point of interest in the space X, and y another point, and a mutual influence value caused between x and y is defined by expression as follows:

$$fr(|x-y|)$$

The weighted potential is determined by calculating a product resulting from multiplying the mutual influence value between the point of interest $x \in X$ and each of the points y belonging to the space X by weighting functions $\omega(x)$ and $\omega(y)$, and by integrating the resulting product with respect to probability measure $\mu$ over the point y in the space X. The weighted potential is determined by the following expression:

$$\omega(x) \int_{y \in X} f_r(|x-y|)\omega(y)\,d\mu(y)$$

Weighted energy $I(\mu)$ of the probability measure $\mu$ is determined by integrating the weighted potentials over all points x belonging to X with respect to probability measure $\mu$ as described in the following equation (1):

$$I(\mu) = \int_{x \in X} \int_{y \in X} f_r(|x-y|)\omega(y)\omega(x)\,d\mu(y)\,d\mu(x) \quad (1)$$

In other words, the weighted energy $I(\mu)$ is obtained by multiplying the mutual influence value between every two points x and y belonging to the space X by the weighting function value $\omega(x)$ and $\omega(y)$ of x and y, and by integrating the product with respect to measure $\mu$ over x and y.

The weighting function $\omega$ is desirably determined by a predetermined probability measure $\nu$ in the space X, or in narrow sense by a probability density function $\psi$. To clarify the weighting function $\omega$, the weighting function $\omega$ may be written as $\omega\nu$ if determined by $\nu$ or may be written as $\omega\psi$ if determined by $\psi$. The weighting functions $\omega\nu$ and $\omega\psi$ are continuous functions defined in the space X just as the probability measure $\nu$ and the probability density function $\psi$ are. The weighting functions $\omega\nu$ and $\omega\psi$ define a weight that is to be multiplied by an energy value at each point in the space X. The definition of the weighting functions is described in detail below.

The exemplary embodiment of the present invention is characterized by the feature that the weighted energy $I(\mu)$ of equation (1) takes a minimum value when $\mu=\nu$, where $\nu$ is a given probability measure. The definitions of the weighting function $\omega$ and the function fr defining the mutual influence value, included in equation (1) defining the weighted energy $I(\mu)$ are described below.

Definition of Function fr

The function fr for calculating the mutual influence value is expressed by function h(x) defined along interval [0,1] as follows:

$$fr(x) = h(x/r) \quad (x < r)$$

$$fr(x) = 0 \quad (x \geq r)$$

where the following three conditions are to be satisfied:

H1: h is monotonically decreasing convex and belongs to the class $C^2$ $$H2: h(1) = \lim_{x \to 1} h'(x) = \lim_{x \to 1} h''(x) = 0$$

H3: $(h''(x^{1/2})/(x^{1/2}))^{1/2}$ is convex

Specific examples of h(x) satisfying conditions H1 through H3 may be the following functions:

$$h(x) = (2/3 - x + 1/3 \cdot x^3)^2 \quad (2)$$

or $h(x) = (1-x)^5$

An example of the function h(x) constituting the function fr is expressed by equation (2), and illustrated by a solid-line plot in FIG. 1. The function fr is determined in accordance with the function h(x) that satisfies the conditions H1 through H3. If a distance x between two points is equal to or shorter than a distance limit r, the function fr is a convex function that decreases monotonically, and has a smooth but more curved convexity. If the distance x is above the limit value r, the function fr is zero. According the present invention, any function h satisfying the conditions H1 through H3 may be used. In the exemplary embodiment of the present invention, the function h(x) of equation (2) is used as a specific example of the function fr. When the function fr is defined using the function h the distance limit r may be a fixed value. In a specific example of the present invention described below, the distance limit r may be set to be large to some degree in view of restrictions of discrete spaces. A graph of exp $(-x^2/(2\sigma^2))$ is denoted by broken line in FIG. 1 as one example of the functions that fail to satisfy the conditions H1-H3.

If the two points x and y are spaced from each other by a distance equal to or longer than the distance r, the mutual influence value is fr(|x−y|)=0. The summing operation of the weighted energy defined by equation (1) is performed on target points that are only all points y∈X within a circle defined by radius r and centered at a point of interest x∈X. A point (blank small circle) outside the circle of radius r may be neglected under condition fr(x)=0 (x≥r).

Definition of Weighting Function ω in Accordance with Probability Measure ν

The weighted energy I(μ) may be defined using any weighting function ω. The weighted energy I(μ) may be rendered more meaningful by defining ω by given probability measure ν or probability density function ψ. The weighting function is expressed as ων, and described below is how the weighting function ων is determined by the probability measure ν. In many cases in practice, it may be considered that the weighting function ω is determined in a limited sense by a probability density function ψ in a discrete space D. With this consideration, the weighting function ω may be intuitively understood (because ω is expressed by a simple sum in place of an integral). More description about this is provided below.

If a probability measure ν is given, ν itself is used. If a probability density function ψ(x) is given, ν is determined for any set A by the following:

$$\nu(A) = \int_{x \in A} \varphi(x) dx$$

The weighting function ω is defined as a solution ω of integral equation (3) below:

$$\omega(x) \int_{y \in X} f_r(|x-y|) \omega(y) d\nu(y) = K \quad (3)$$

In other words, ω is defined as a weighting function in accordance with which the weighted potential is a constant (K) at each point x in response to a given probability measure ν.

K is any positive constant. Typically, K is $\int_{y \in x} fr(|y|) dy$. The solution of integral equation (3) may be approximated using a successive iteration method. For example, approximation may be performed by mapping initial value η(x)=1 for all x∈X by multiple times in accordance with mapping T (from function to function) defined by the following equation:

$$T(\eta(x)) = \sqrt{K \cdot \eta(x) \cdot \left( \int_{y \in X} f_r(|x-y|) \eta(y) d\nu(y) \right)^{-1}}$$

Typically, sufficient convergence results are ensured if initial value η is mapped in accordance with mapping T by several times. Alternatively, if a probability density function ψ(x) is given, a definition of the appropriate initial value η may be η(x)=ψ(x)$^{-1/2}$. Since ω(x) is characteristic of function form similar to the function form of ψ(x)$^{-1/2}$, the setting of the initial value to this function expedites convergence.

As described above, the weighted energy I(μ) of equation (1) is defined by determining the function fr by h(x) satisfying the conditions H1-H3, and by approximating ω defined by equation (3) by iterating mapping T. The probability measure ν given in the space X may be thus guaranteed as an energy minimum. In other words, the weighted energy I(μ) of any probability measure μ in the space X is minimized with μ=ν. How the probability measure μ is close to the probability measure ν may be quantitatively evaluated using weighted energy I(μ), and the probability measure μ may be approximated to the probability measure ν through energy decrease as described below (the concept of closeness between μ and ν is mathematically defined by the concept of the weak* topology in the space of all probability measures). If function fr not satisfying the conditions H1-H3 as denoted by broken line in FIG. 1 is used, or if ω is not correctly defined by given ν, such a property is not guaranteed. The definition of ω is thus meaningful.

Definition of Weighting Function ω in Accordance with Probability Density Function ψ in Discrete Space D The probability measure ν in the space X mathematically defined as described above may be considered without any problem as the probability density function ψ defined in the discrete space D in many cases in practice. In such a case, integral symbol $\int_{x \in x}$ is replaced with $\Sigma_{x \in D}$ in the definition of energy. Weighted energy I(φ) of probability density function φ is thus defined by the following equation (4):

$$I(\phi) = \sum_{x \in D} \sum_{y \in D} f_r(|x-y|)\omega_\varphi(y)\omega_\varphi(x)\phi(y)\phi(x) \qquad (4)$$

where $\omega$ is referred to as $\omega\psi$ to clearly indicate that $\omega$ is determined by $\psi$.

Weighting function $\omega\psi$ in the space D determined by probability density function $\psi$ results as a solution of the following discrete integral equation with $K = \Sigma_{y \in D} \, \text{fr}(|y|)$:

$$\omega_\varphi(x) \int_{y \in D} f_r(|x-y|)\omega_\varphi(y)\varphi(y) = K$$

In other words, the weighting function $\omega\psi$ is defined as a weighting function in which a weighted potential expressed in a discrete fashion takes a constant (K) at each x in response to given $\psi$.

An approximate value of the weighting function $\omega\psi$ is determined in response to any function η in the space D by iterating mapping T (mapping from function to function) represented by the following equation (5). The initial value of the function η may be η(x)=1 or η(x)=$\psi$(x)$^{-1/2}$ for all x∈D in the same way as described above.

$$T(\eta(x)) = \sqrt{K \cdot \eta(x) \cdot \left( \sum_{x \in D} f_r(|x-y|)\eta(y)\varphi(y) \right)^{-1}} \qquad (5)$$

If the weighted energy I($\phi$) of any probability density function $\phi$ is defined by the weighting function $\omega\psi$ determined by a given probability density function $\psi$ and the function fr determined by h satisfying the conditions H1 through H3, energy is minimized with $\phi$=$\psi$. Here, let $\phi$ represent any probability density function, and let X represent a set composed of n points within the space D, and the weighted energy is simplified with a probability limited to 1/n as follows:

$$I(\phi) = \frac{1}{n^2} \sum_{x \in X} \sum_{y \in X} f_r(|x-y|)\omega_\varphi(y)\omega_\varphi(x)$$

wherein the value 1/n is a constant and may be included in $\omega\psi$ in calculation.

The definitions of the functions and parameters used to define the weighted energy have been discussed. Described below is a method of approximating $\psi$ by $\phi$ by decreasing the weighted energy I($\phi$) if the probability density function $\psi$ is given.

Energy Decreasing

According to the exemplary embodiment, how the probability density function $\phi$ is close to the probability density function $\psi$ is quantitatively evaluated by using the weighted energy I($\phi$). The probability density function $\psi$ is approximated by successively decreasing the weighted energy of $\phi$. The successive decrease of the weighted energy is executed by taking an appropriate point v with respect to each point u, and by varying the $\phi$ value of u and v by a predetermined change amount k>0 without changing the total $\phi$ value. More specifically, $\phi$(u) and $\phi$(v) are varied as expressed by the following equation:

$$\phi(u) := \phi(u) - k$$

$$\phi(v) := \phi(v) + k$$

If the $\phi$ value exceeds a permissible value, no variation is performed (for example, if updating causes the $\phi$ value to be negative).

The values varied in the total weighted energy value are only values related to the point u and the point v and values related to any other two points remain unchanged. The variation may be simply performed only if the values related to only the points u and v expressed by equation (6) in the total weighted energy value (hereinafter referred to as weighted energy decrease amount) are positive. Successive calculations of the weighted energy I($\phi$) value itself become unnecessary.

$$2 \sum_{x \in D} f_r(|x-u|)\omega_\varphi(x)\omega_\varphi(u)\phi(x) - \qquad (6)$$
$$kf_r(0)\omega_\varphi(u)^2 - 2 \sum_{x \in D} f_r(|x-v|)\omega_\varphi(x)\omega_\varphi(v)\phi(x) -$$
$$kf_r(0)\omega_\varphi(v)^2 + 2kf_r(|u-v|)\omega_\varphi(u)\omega_\varphi(v)$$

A process of decreasing energy on all the points u∈D is iterated by a predetermined number of times. An approximate minimum value of weighted energy thus results, wherein the relationship of $\phi \approx \psi$ holds, i.e., $\psi$ is sufficiently approximated by $\phi$.

The change amount k is typically reduced and converged to zero in an iteration process. In the iteration process, $\phi$ approaches $\psi$, and the change amount k is set to be minimal in order to approximate $\phi$ in smaller steps. However, depending on purposes, the change amount k is not fixed but varied within a specific range. Alternatively, the change amount k is restricted to only a predetermined value. More information about the change amount k is provided below.

The probability density function $\phi$ may take any real number equal to or larger than zero. If $\phi$ is limited to n discrete points (a set of n points in the space D is represented by X, and each point has a probability of 1/n), the probability taken by the probability density function $\phi$ is limited to 0 or 1/n (i.e., 1/n for x∈X, and 0 for x∈D\X). The change amount k is limited to k=1/n.

From the above discussion, it is noted that the total sum of $\phi$ values is theoretically fixed to 1 when energy is decreased from the probability density function $\phi$ to the probability density function $\psi$. "Probability" is for mathematical convenience only, and an actual desirable condition is that the total sum of $\phi$ values continues to be constant, and is equal to the total sum of $\psi$ values. If $\phi$ is limited to discrete n points, the value theoretically taken by $\phi$ is 0 or 1/n. In practice, however, no problem arises if $\phi$ is 0 or 1, or 0 or 255.

The method of determining the weighting function $\omega$ from a probability measure v or a probability density function $\psi$, and the method of decreasing the weighted energy defined from the weighting function $\omega$ have been discussed. The weighting function $\omega$ is a theoretically convenient and appropriate solution. However, the weighting function $\omega$ may be defined using another method. Besides the above-described hill climbing method that simply decreases energy, a simulated annealing method may be used. In the simulated annealing method, an increase of a predetermined value is permitted while the permissible amount thereof is reduced.

Figure 3:
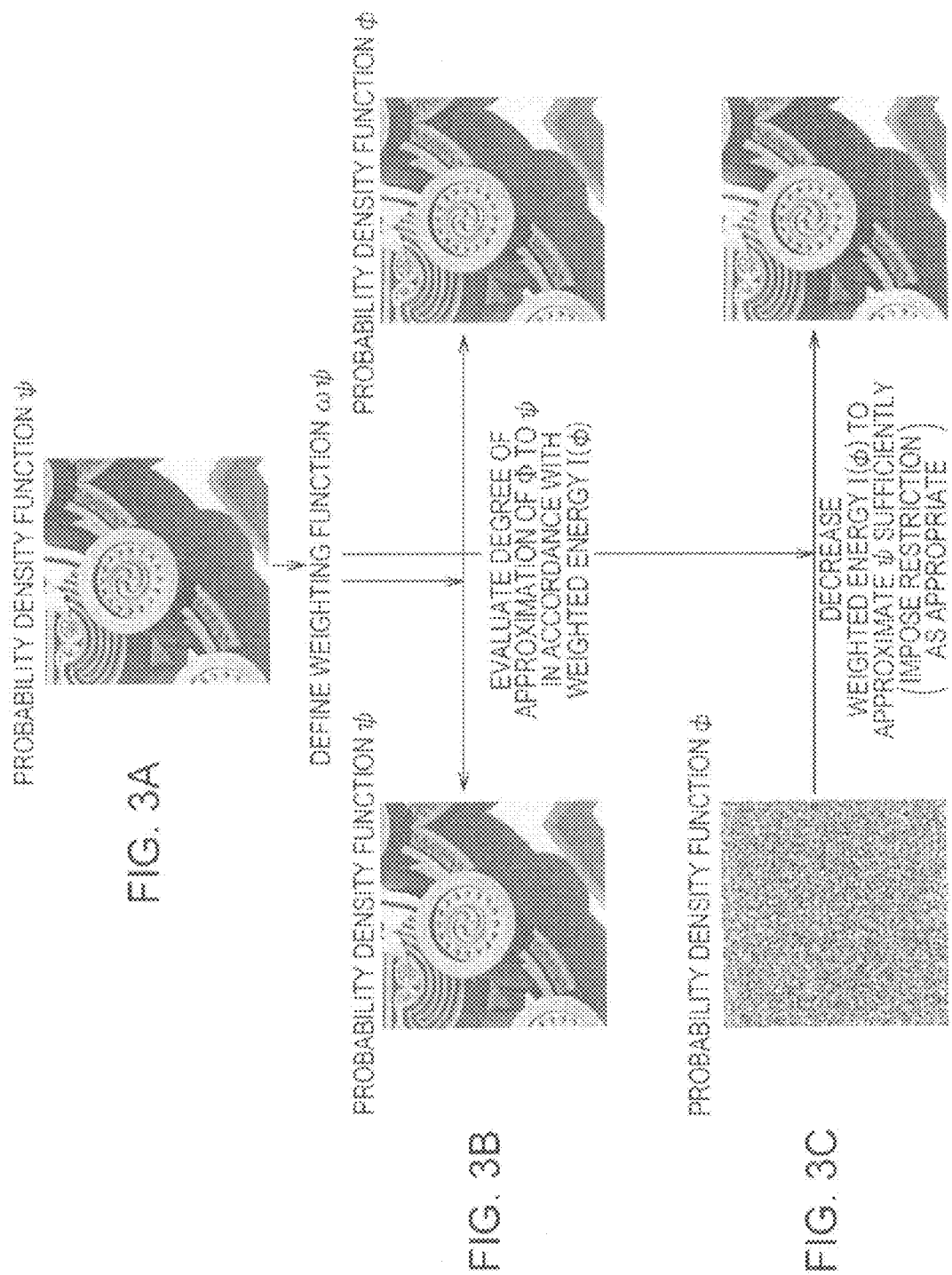
FIGS. 3A through 3C diagrammatically illustrate a distribution evaluation process and a distribution determination process.

FIGS. 3A through 3C illustrate the concepts of the distribution evaluation process and the distribution determination process discussed heretofore. The weighting function $\omega\psi$ is determined from image data represented by the probability density function $\psi$ as illustrated in FIG. 3A. In the distribution evaluation process, the degree of approximation between image data represented by the probability density function $\psi$ and any data represented by the probability density function $\phi$ is determined using the weighted energy determined by the weighting function $\omega\psi$ as illustrated in FIG. 3B. In the distribution determination process, the $\phi$ value (corresponding to a density value or a size value) is varied to approximate $\psi$ as illustrated in FIG. 3C.

More specifically, in the distribution evaluation process as illustrated in FIG. 3B, the weighted energy $I(\phi)$ of the probability density function $\phi$ is calculated using the weighting function $\omega\psi$ determined from the given probability density function $\psi$, and the degree of approximation between $\psi$ and $\phi$ is evaluated in accordance with the weighted energy $I(\phi)$ (the smaller $I(\phi)$ value or the smaller $(I(\phi)-I(\psi))$ value, the better approximation).

In the distribution determination process as illustrated in FIG. 3C, the $\phi$ value of any probability density function $\phi$ is varied using the weighting function $\omega\psi$ determined by the given probability density function $\psi$ such that the weighted energy $I(\phi)$ decreases. Thus, $\phi$ approximates $\psi$. Some degree of effectiveness may result if a constraint is imposed on the $\phi$ value. The constraint is described below.

Distribution Evaluation Apparatus, Distribution Determining Apparatus, and Image Processing Apparatus A distribution evaluation apparatus, a distribution determining apparatus 10, and an image processing apparatus of the exemplary embodiment are described below in terms of hardware configuration. In the exemplary embodiment, the distribution evaluation apparatus may be understood as part of the distribution determining apparatus 10 and the image processing apparatus may be understood as the distribution determining apparatus in practice. The operation of the image processing apparatus is described together with the hardware configuration of the distribution determining apparatus covering general functions. It is noted that the distribution evaluation apparatus, although being part of the distribution determining apparatus 10, is used alone to evaluate which of two given distribution states is closer to the probability density function $\psi$.

The distribution determining device 10 of the exemplary embodiment regards an input image as the probability density function $\psi$, defines the weighted energy (equation (4)), and decreases energy under a predetermined condition about any $\phi$. The distribution determining device 10 thus gains an image sufficiently approximate to $\psi$.

Figure 4:
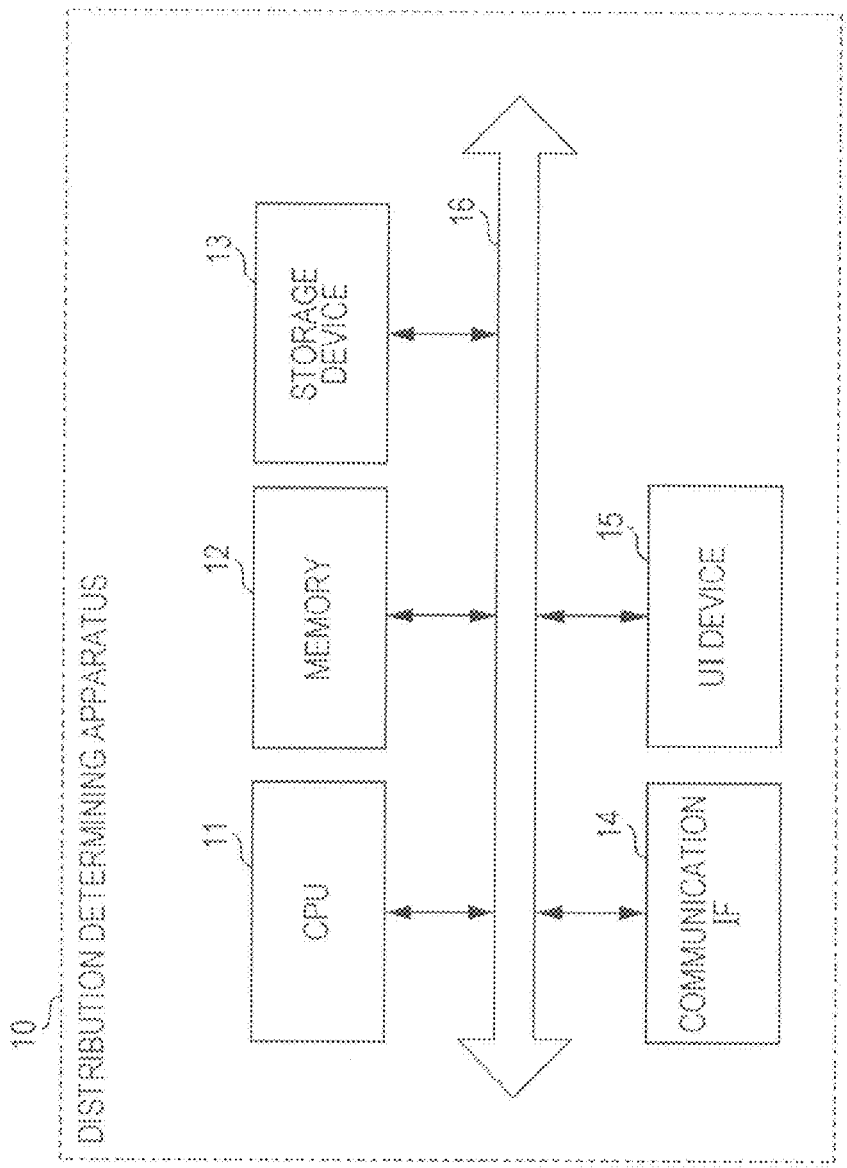
FIG. 4 illustrates a hardware configuration of a distribution determining apparatus of an exemplary embodiment of the present invention.

FIG. 4 illustrates the hardware configuration of the distribution determining device 10 executing a distribution evaluation method, a distribution determination method, and an image processing method.

As illustrated in FIG. 4, the distribution determining device 10 of the exemplary embodiment includes central processing unit (CPU) 11, memory 12, storage device 13 such as a hard disk drive (HDD), communication interface (IF) 14, and UI (user interface) device 15. The communication interface 14 transmits data to or receives data from an external apparatus via a network. The UI device 15 includes a touchpanel or a liquid-crystal display, and a keyboard. Those elements are interconnected via a control bus 16.

The CPU 11 controls the operation of the distribution determining device 10 by executing a predetermined process under the control of a distribution determination program stored on one of the memory 12 and the storage device 13. According to the exemplar embodiment, the CPU 11 reads and executes the distribution determination program from one of the memory 12 and the storage device 13. Alternatively, the distribution determination program may be stored on a storage medium such as CD-ROM and may then be supplied to the CPU 11.

The distribution determining device 10 is a general-purpose computer having the distribution determination program installed thereon. The distribution determining device 10 gains via one of the communication interface 14 and the storage device 13 information about an original image (probability density function) $\psi$, and a size of the image. The distribution determining device 10 determines an image (probability density function) $\phi$ approximating the probability density function $\psi$ in accordance with the gained information. The distribution determining device 10 also gains position information about a located object, and information about the image, and evaluates a distribution in accordance with the gained information.

Figure 5:
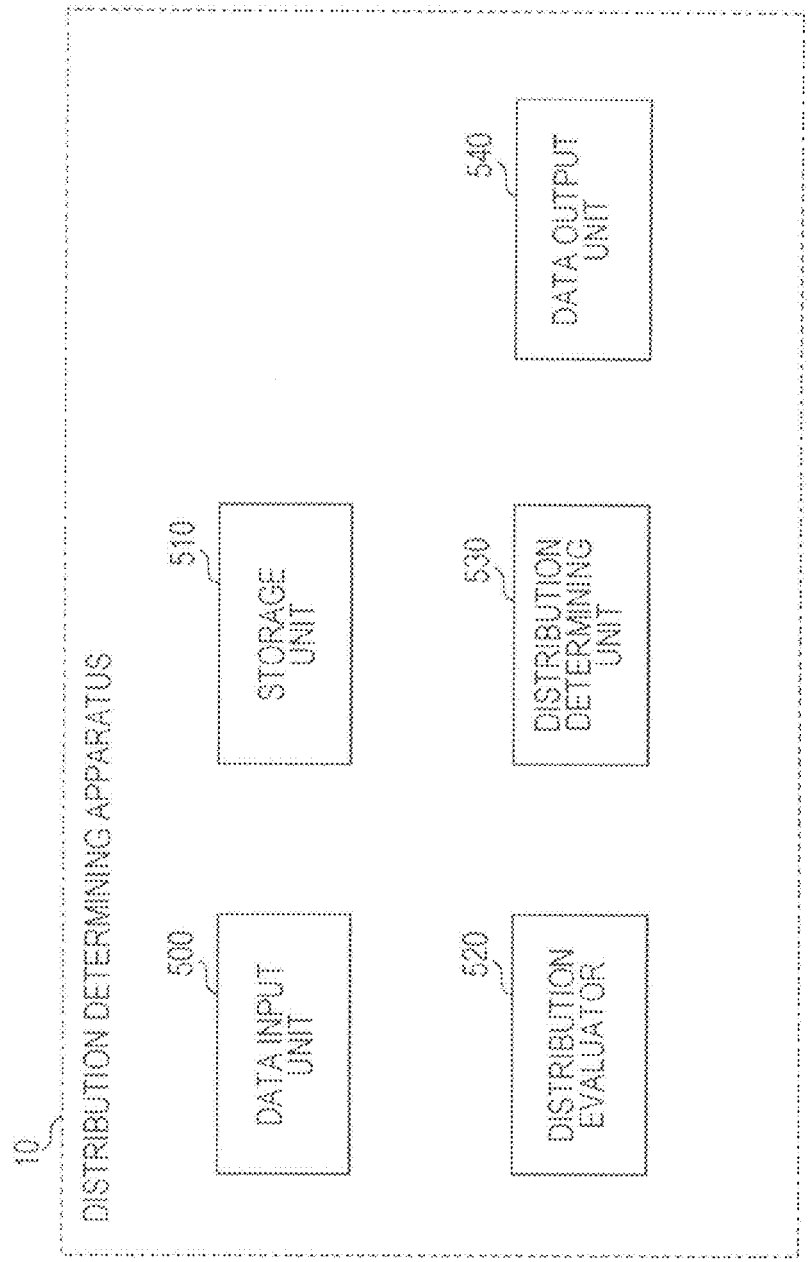
FIG. 5 illustrates a functional configuration of the distribution determining apparatus of the exemplary embodiment of the present invention.

FIG. 5 is a functional block diagram illustrating the distribution determining device 10 that is implemented when the distribution determination program is executed. As illustrated in FIG. 5, the distribution determining device 10 of the exemplary embodiment includes data input unit 500, storage unit 510, distribution evaluator 520, distribution determining unit 530, and data output unit 540. Optionally, part or whole of each element of the distribution determining device 10 may be implemented using hardware such as application specific integrated circuit (ASIC).

The data input unit 500 gains, as data, information such as an original image $\psi$, and the size of the image, and outputs the gained data to the storage unit 510.

The storage unit 510 stores data of the original image $\psi$ input from the data input unit 500. The storage unit 510 also supplies a work area to the distribution evaluator 520 and the distribution determining unit 530.

The distribution evaluator 520 evaluates the goodness of the distribution of an image $\phi$ with respect to the original image $\psi$ by a weighted energy value defined by equation (4), using the weighting function $\omega\psi$ that is calculated in accordance with the original image $\psi$ stored on the storage unit 510. More specifically, the distribution evaluator 520 operates as an evaluation value calculating unit. The evaluation value calculating unit calculates a product by multiplying the mutual influence value determined by the function fr having as a variable a distance between two points x and y, by weighting function values $\omega(x)$ and $\omega(y)$, and $\phi(x)$ and $\phi(y)$ values of an image $\phi$ defining densities or sizes of two pixels x and y, and then summing the products into the weighted energy. The distribution evaluator 520 calculates the weighted energy as an evaluation value indicating the goodness of the distribution of the image $\phi$ to the original image $\psi$. The process of the distribution evaluator 520 is described in detail below.

The distribution determining unit 530 performs a distribution update process on the image $\phi$ stored on the storage unit 510 to modify a $\phi$ value at a given point of time. More specifically, in order to decrease the weighted energy value calculated by the distribution evaluator 520, the distribution determining unit 530 varies the density or the size (the $\phi$ value) of the input $\phi$ such that the weighted energy decrease at the point x defined by equation (6) becomes positive. The process of the distribution determining unit 530 is described in detail below.

The data output unit 540 outputs the evaluation result of the distribution evaluator 520 to one of a communication device 22 and a storage device 24. The evaluation result is the value of the calculated weighted energy or the result of energy decrease provided by the distribution determining unit 530, i.e., the image ϕ sufficiently approximating the original image ψ.

The process of each of the distribution evaluator 520 and the distribution determining unit 530 is described below. The basic of the processes has been discussed in detail, and an operation obvious from the preceding discussion and an operation obvious in the related technical field are not discussed herein. For example, if an image or a function is defined, no particular discussion is provided about a size or a memory related to the image or the function on the premise that the size and the memory have already been reserved.

Figure 6:
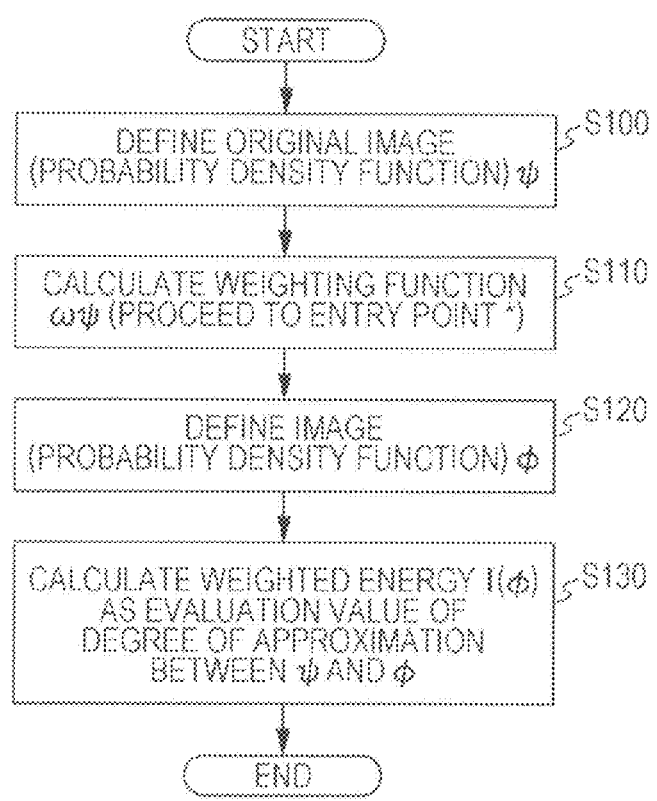
FIG. 6 is a flowchart illustrating the distribution evaluation process of the distribution determining apparatus of the exemplary embodiment of the present invention.

The process of the distribution evaluator 520 is described with reference to a flowchart of FIG. 6. In S100, the distribution evaluator 520 defines an original image as an input comparison target in the space D as the probability density function ψ on the storage unit 510. D may be a two-dimensional space having a finite size, for example. In S110, the distribution evaluator 520 calculates and defines the weighting function ωψ on the storage unit 510. The definition method of the weighting function ωψ in S110 has been discussed, but is described again together with the process below. In S120, the distribution evaluator 520 defines an image ϕ in the space D serving as an input evaluation target. In S130, the distribution evaluator 520 calculates the weighted energy I(ϕ) defined by equation (4) as the evaluation value of the degree of approximation between ψ and ϕ, and then outputs the weighted energy I(ϕ) as the evaluation value.

Figure 7:
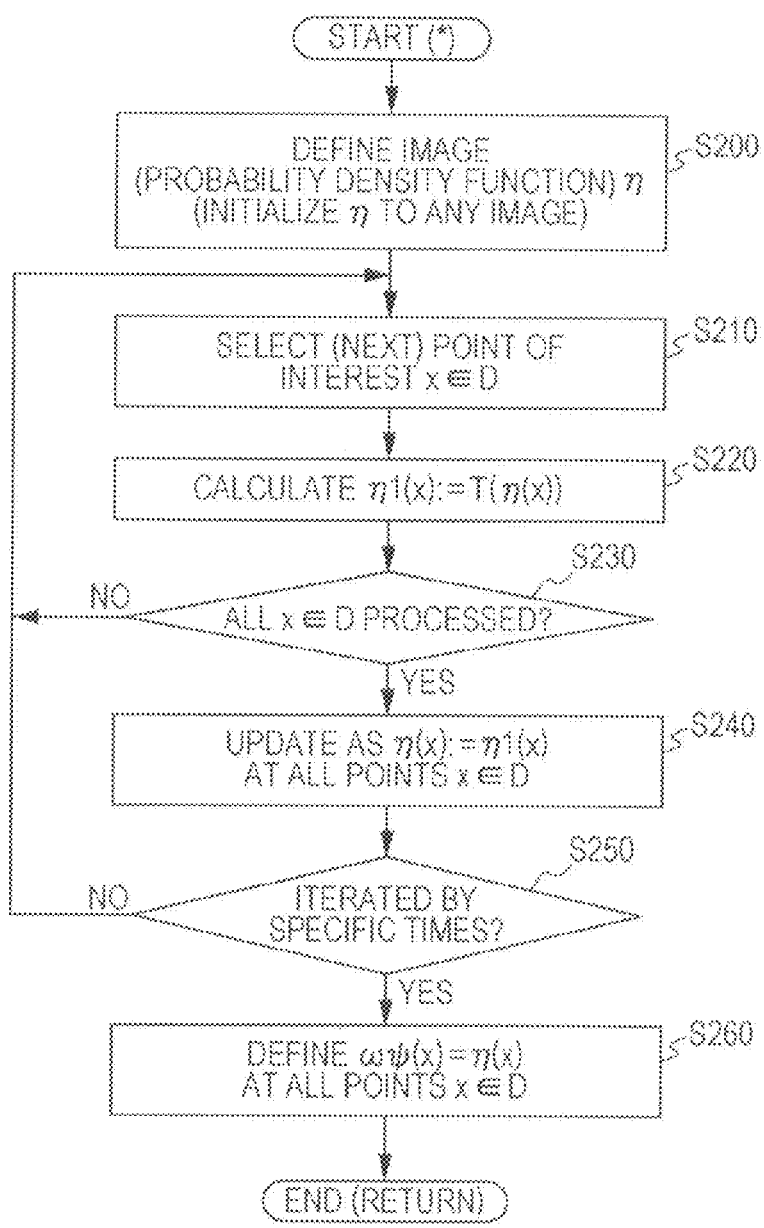
FIG. 7 is a flowchart illustrating a definition method of a weighting function ωψ.

The definition method of the weighting function ωψ in S110 in the process of the distribution evaluator 520 is described with reference to a flowchart of FIG. 7. The process flow related to the definition of the weighting function is called from S110 in the process of the distribution evaluator 520 or from S301 in the process of the distribution determining unit 530 to be discussed later. The process of FIG. 7 is thus commonly used. In S200, any image η is defined in the space D. For example, η(x)=1 or η(x)=ψ(x)$^{-1/2}$ for all x∈D. In S210, a point of interest x∈D is selected. In S220, T(η(x)) defined by equation (5) is calculated. The resulting value is substituted for function η1(x) prepared as a temporary. In S230, the distribution evaluator 520 determines the calculation in S220 has been completed for all x∈D. If the calculation in S220 has not been completed, processing returns to S210 to repeat the process. If the calculation in S220 has been completed, processing proceeds to step S240 to update η(x):=η1(x) for all x∈D.

In S250, the distribution evaluator 520 determines whether the update operation of η(x) in S240 has been iterated by a specific number of times. If the update operation of η(x) has not been iterated by the specific number of times, processing returns to S210 to update η(x) for all points x∈D. If the update operation of η(x) has been iterated by the specific number of times, processing proceeds to S260 to define ωψ(x)=η(x) at all points x∈D. Processing thus ends. For example, the specific number of times as many as 30 times is enough to reach a sufficient convergence.

Figure 8:
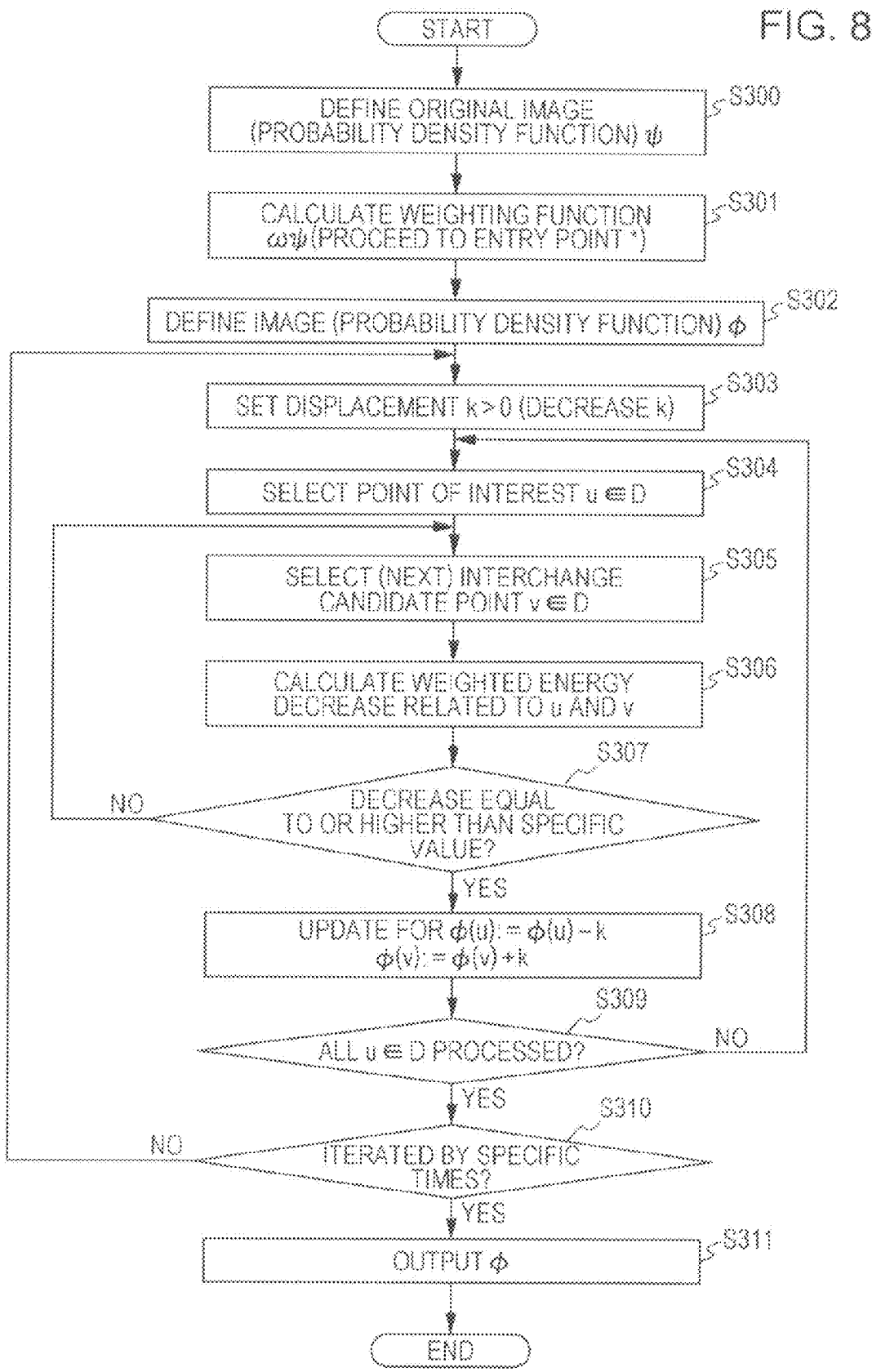
FIG. 8 is a flowchart illustrating a distribution determination process of the distribution determining apparatus of the exemplary embodiment of the present invention.

The process of the distribution determining unit 530 is described with reference to a flowchart of FIG. 8. In S300, the distribution determining unit 530 defines an input original image in the space D as the probability density function ψ the storage unit 510. In S301, the distribution determining unit 530 calculates and defines the weighting function ωψ on the storage unit 510. The definition method of the weighting function ωψ has been discussed with reference to S110. Processing proceeds to S302. The distribution determining unit 530 defines an initial image ϕ in the space D serving as a distribution determining target. Since the original image ψ and the initial image ϕ are regarded as probability density functions, ϕ is desirably (but not necessarily) selected such that the total sums of both are approximately equal to each other in the space D.

In S303, the distribution determining unit 530 sets a change amount k>0 for an energy decrease process. In accordance with the k value set herein, the values of the image ϕ are interchanged by k to decrease the weighted energy. To this end, a point of interest u is selected first in S304. In S305, the distribution determining unit 530 selects a point v as an interchange destination candidate. In 5306, the distribution determining unit 530 calculates the weighted energy decrease amount defined by equation (6). If it is in S307 determined that the calculated weighted energy decrease amount is equal to or higher than a specific value (zero for example), the distribution determining unit 530 determines that value interchanging is to be permitted. In S308, the distribution determining unit 530 updates ϕ values as follows:

$$\phi(u):=\phi(u)-k$$

$$\phi(v):=\phi(v)+k$$

If the calculated weighted value is lower than the specific value, the distribution determining unit 530 determines that the energy decrease responsive to the selected point v is not sufficient. Processing returns to S305. The distribution determining unit 530 selects a next point v. If the point v is selected such that the weighted energy decrease amount of equation (6) is positive, and then the value interchange is performed on the point u, the weighted energy I(ϕ) decreases as previously discussed. In the selection of the point v, the point u may also be set to be selectable as the point v. If a point that decreases energy is not found, the point v=the point u is automatically selected. No energy decrease is not performed at the point u in practice, and the selection process proceeds to a next point u. As the weighted energy sufficiently decreases, the chance of such occurrence increases.

In S309, the distribution determining unit 530 determines whether the ϕ value interchange process of all the points u with reference to the appropriate v has been completed. If the ϕ value interchange process has not been completed, processing returns to S304 to repeat the process on a next unprocessed point u. If the ϕ value interchange process has been completed, processing proceeds to S310. The distribution determining unit 530 determines whether the update process of the entire image ϕ has been iterated by a specific number of times. If the update process of the entire image ϕ has not been iterated by the specific number of times, processing returns to S303. The k value is set to be lower, and the update process of ϕ(x) is performed on all the points u∈D. If the update process of the entire image ϕ has been iterated by the specific number of times, the distribution determining unit 530 determines that ϕ is sufficiently approximate to ψ. Processing proceeds to S311 to output the image ϕ, and then ends. The number of iterations is typically 10 to 100 times.

The process of the distribution determining unit 530 has been discussed. Other points to be taken note of are described below.

In the process of the distribution determining unit 530, a constraint may be imposed on the image ϕ and the k value as appropriate. If the image ψ takes one of 0 through 255, ϕ may take one of 0 through 255 as well. The constraint may be that a total of n (for example, n=2, 4, 8, and 16) out of 0 through 255. In this case, when the ϕ value is interchanged between the two points u and v, an appropriate constraint may be imposed on the value taken by k such that the ϕ value does not deviate from a permissible value. The constraints, if imposed, provide a lot of usefulness as described below with reference to specific examples.

Examples of Distribution Determination Process

The selection of the point v with which the point u interchanges the ϕ values does not necessarily cover the entire space D defining an image. For example, the selection may be limited to a region surrounding the point u. The region for selection may be narrowed as the k value becomes smaller in the iteration process. In the above discussion, the distribution determining unit 530 in the determination operation in S307 permits the ϕ values to be interchanged if the calculated weighted energy decrease is equal to or above the specific value. The exemplary embodiment is not limited to the determination operation. For example, a point v that causes a maximum weighted energy decrease amount to result may be used. Alternatively, upon turning the weighted energy decrease amount positive, that point v may be immediately used. Typically, the point v that causes the weighted energy decrease amount positive may be a candidate. In accordance with the concept of the simulated annealing method, a point v having a negative weighted energy decrease amount may be permitted in the earlier iterations.

Example of Distribution Determination Process

In the following examples, the weighting function ωψ is determined based on an actual original image ψ and an image is generated in accordance with the distribution determining method of the exemplary embodiment of the present invention.

SPECIFIC EXAMPLE 1

Figure 9:
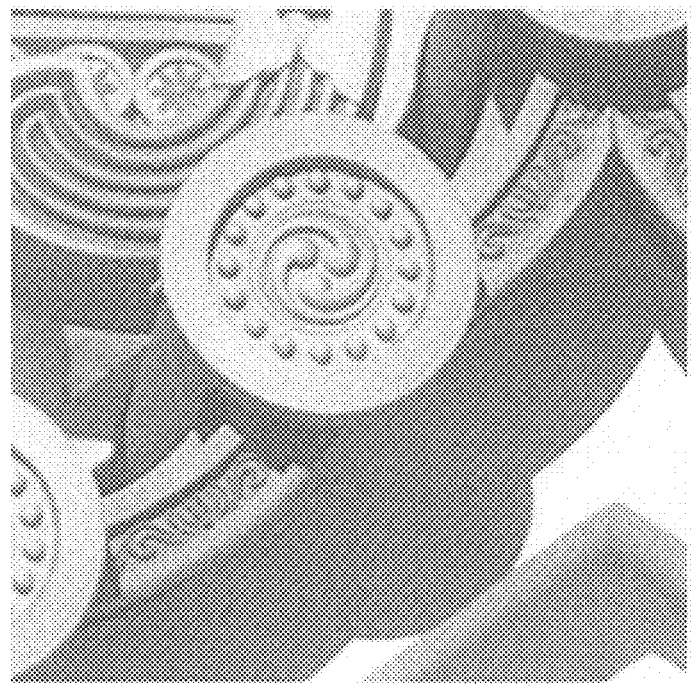
FIG. 9 illustrates an example of an original image expressed by a probability density function ψ(x)
Figure 10:
FIG. 10 illustrates a plot of $1/\omega\psi(x)^2$ in which a weighting function is determined as ωψ(x) in accordance with the original image of FIG. 9.

FIG. 9 illustrates an example of an original image represented by a probability density function ψ(x). The original image data of FIG. 9 is constructed of 200×200 pixels in the space D, and one of values 0 through 255 is defined for each of the pixels. The weighting function is determined as ωψ(x) from the original image of FIG. 9 in accordance with the flowchart of FIG. 7. FIG. 10 is a picture resulting from plotting $1/\omega\psi(x)^2$. In comparison with the original image of FIG. 9, a border where a pixel value changes looks blurred in FIG. 10 as if the border was graded.

Figure 11:
FIG. 11 illustrates an image that is generated by decreasing weighted energy in the original image of FIG. 9, and determining a density distribution of an initial image (probability density function) φ.

The weighted energy (equation (4)) of the image is defined using the weighting function ωψ. A density distribution is determined by decreasing the weighted energy sufficiently with the ϕ value of any function (image) ϕ varied at each point u in accordance with the distribution determination process of the exemplary embodiment (as described with reference to the flowchart of FIG. 8). The resulting image is illustrated in FIG. 11. With reference to FIG. 11, the image of FIG. 11 converges to a result substantially equal to the original image ψ. If the weighted energy is defined by defining the weighting function ωψ from the original image ψ, followed by the minimization of the energy of any image ϕ, the original image ψ is restored. In other words, the original image ψ is restored if the weighting function ωψ is available.

The weighting function ωψ of FIG. 10 is constantly blurred in comparison with the original image ψ of FIG. 9. From the standpoint of image compression, a higher compression efficiency results if the weighting function ωψ is compressed than if the original image ψ is compressed. From another standpoint, the weighting function ωψ serves as one type of key. The original image ψ may be restored from the weighting function ωψ if the function fr defining energy is identified. Since ωψ(x) is a function (image) close to $1/\psi(x)^{1/2}$ as described above, the condition of the image may be useful because it is visible as a blurred image even prior to restoration.

As described above, the original image ψ and any initial image ϕ are theoretically defined as probability density functions, and the total sums of the pixel values of the two images are to be constantly equal to each other. To this end, the initial image ϕ is to be defined such that the total sum of the pixel values of the initial image ϕ is equal to the total sum of the pixel values of the original image ψ. From this standpoint, it is convenient that ϕ(x) is defined as $\phi(x)=1/\omega\psi(x)^2$ based on $K=\Sigma_{y \in D} fr(|y|)$. This is because the total sum of the pixel values of $1/\omega\psi(x)^2$ is approximately equal to the total sum of the pixel values of the original image ψ. From the standpoint of energy decrease, the initial image ϕ is also acceptable if the initial image ϕ is not defined such that the total sum of the pixel values of the initial image ϕ is equal to the total sum of the pixel values of the original image ψ. In this case, energy decreasing may result in an image sufficiently close to but different from the initial image only in terms of an average density.

SPECIFIC EXAMPLE 2

Color Decreasing Process and Halftone Process

A color decreasing process and a halftone process may be performed by limiting a value taken by the probability density function ϕ (any initial image). For example, if the value taken by the probability density function ϕ is limited to a specific value, the color decreasing process may be performed. If the value taken by the probability density function ϕ is limited to two values, the halftone process may be performed.

Figure 12:
FIG. 12 illustrates an image that is generated by decreasing energy with values taken by the probability density function φ set to be 16 values.
Figure 13:
FIG. 13 illustrates an image that is generated by decreasing energy with the values taken by the probability density function φ set to be eight values.
Figure 14:
FIG. 14 illustrates an image that is generated by decreasing energy with the values taken by the probability density function φ set to be four values.
Figure 15:
FIG. 15 illustrates an image that is generated by decreasing energy with the values taken by the probability density function φ set to be two values.

FIG. 12 illustrates an image resulting from energy minimization with the value taken by the probability density function ϕ limited to 16 values (starting with value 8 and increasing in steps of 16). FIG. 13 illustrates an image resulting from energy minimization with the value taken by the probability density function ϕ limited to eight values (starting with value 16 and increasing in steps of 32). FIG. 14 illustrates an image resulting from energy minimization with the value taken by the probability density function ϕ limited to four values (starting with value 32 and increasing in steps of 64). FIG. 15 illustrates an image resulting from energy minimization with the value taken by the probability density function ϕ limited to two values (value 0 or value 255). In each case, it is verified that the ϕ value converges sufficiently enough to approximate the original image ψ. The value taken by probability density function ϕ is not limited to the selections described above. For example, if four values are used, the values taken by probability density function ϕ may be 0, 85, 170, and 255. In practice, the value selection step may not necessarily be constant, and the k value may be selected in accordance with the value selection step during the energy decreasing.

SPECIFIC EXAMPLE 3

Halftone Process with Different Sizes Mixed

Figure 16:
FIG. 16 illustrates a half-tone image that is based on a fixed dot size and is generated by decreasing energy with the values taken by the probability density function φ set to be two values.
Figure 17:
FIG. 17 illustrates a half-tone image that is based on ten-level dot sizes and is generated by decreasing energy with the values taken by the probability density function φ set to be 11 values.
Figure 18:
FIG. 18 illustrates a half-tone image that is based on two-level dot sizes and is generated by decreasing energy with the values taken by the probability density function φ set to be three values.
Figure 19:
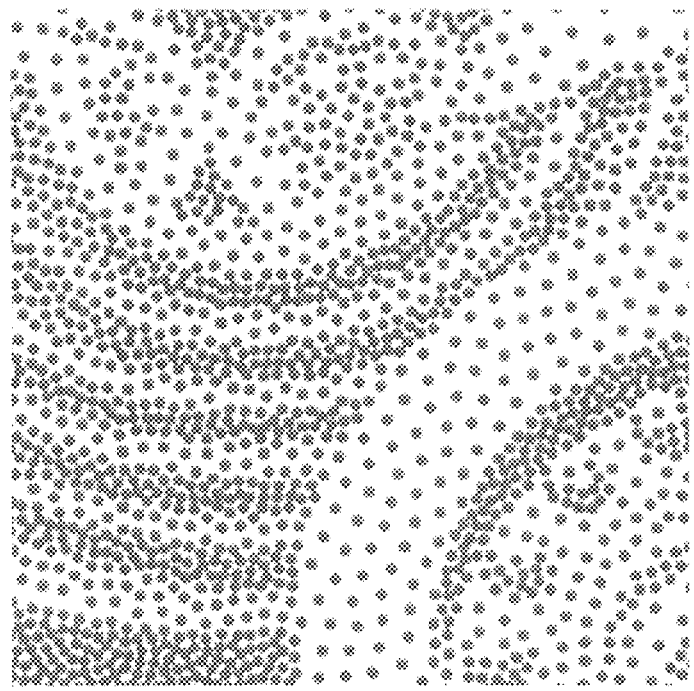
FIG. 19 is an expanded view of a portion of the image of FIG. 16.
Figure 20:
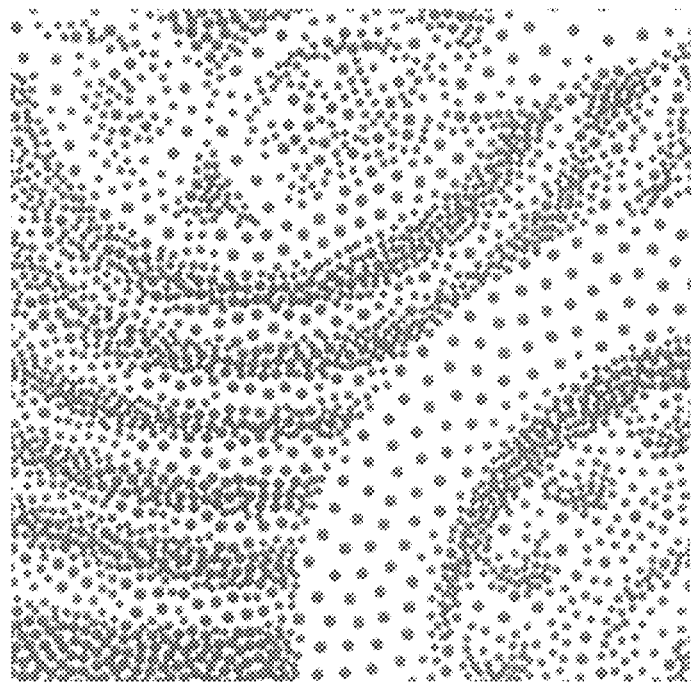
FIG. 20 is an expanded view of a portion of the image of FIG. 18.

A mixed-dot-size halftone process may be performed as a display method of the color decreasing process described with reference to the specific example 2. In the mixed-dot-size halftone process, a dot size may be assigned instead of density. Another constraint may be included. FIG. 16 illustrates an image displayed with a fixed dot size and with the value taken by probability density function ϕ limited to two values. FIG. 17 illustrates an image resulting from a constraint that the value taken by probability density function $\phi$ are 11 values and that the dot sizes are 10-step sizes. FIG. 18 illustrates an image resulting from a constraint that the value taken by probability density function $\phi$ are three values and that the dot sizes are 2-step sizes, where a smaller size dot is arranged in an edge portion of the image. FIGS. 19 and 20 respectively illustrate enlarged views of portions of FIGS. 16 and 18.

As clear from the above discussion, the specific examples 1 through 3 are identical in configuration but different in constraint during energy decreasing. More specifically, the specific examples 1 through 3 operate under the same concept of "the distribution of the located objects different in density or size responsive to the probability density function under energy decrease." The specific example 1 is free from any constraint, in practice and takes any density. The specific example 2 is subject to a limitation in the selectable density. The specific example 3 displays the image in density in place of size. Particularly, in the specific example 3, a restriction is imposed on the dot size depending on an image region within the image. From the standpoint that the exemplary embodiment allows the constraints to be imposed in view of the basic principle of the weighted energy, the specific examples 1 through 3 may be treated in a consistent fashion. The image compression in the specific example 1 serves the purpose of increasing a compression rate by compressing a blurred image, and this is additional usefulness.

SPECIFIC EXAMPLE 4

Layout of Resources in Accordance with Demand Distribution

The halftone process faithfully restoring an original image described with reference to the specific examples 2 and 3 (dot layout of two values) may be interpreted as a "distribution process of located objects faithfully conforming to the probability density function $\psi$" in a general sense. There is an actual challenge that "limited resources (for example, n resources) are to be efficiently located in order to efficiently meet a given distribution demand." The exemplary embodiment may provide a solution to such a challenge.

Figure 21:
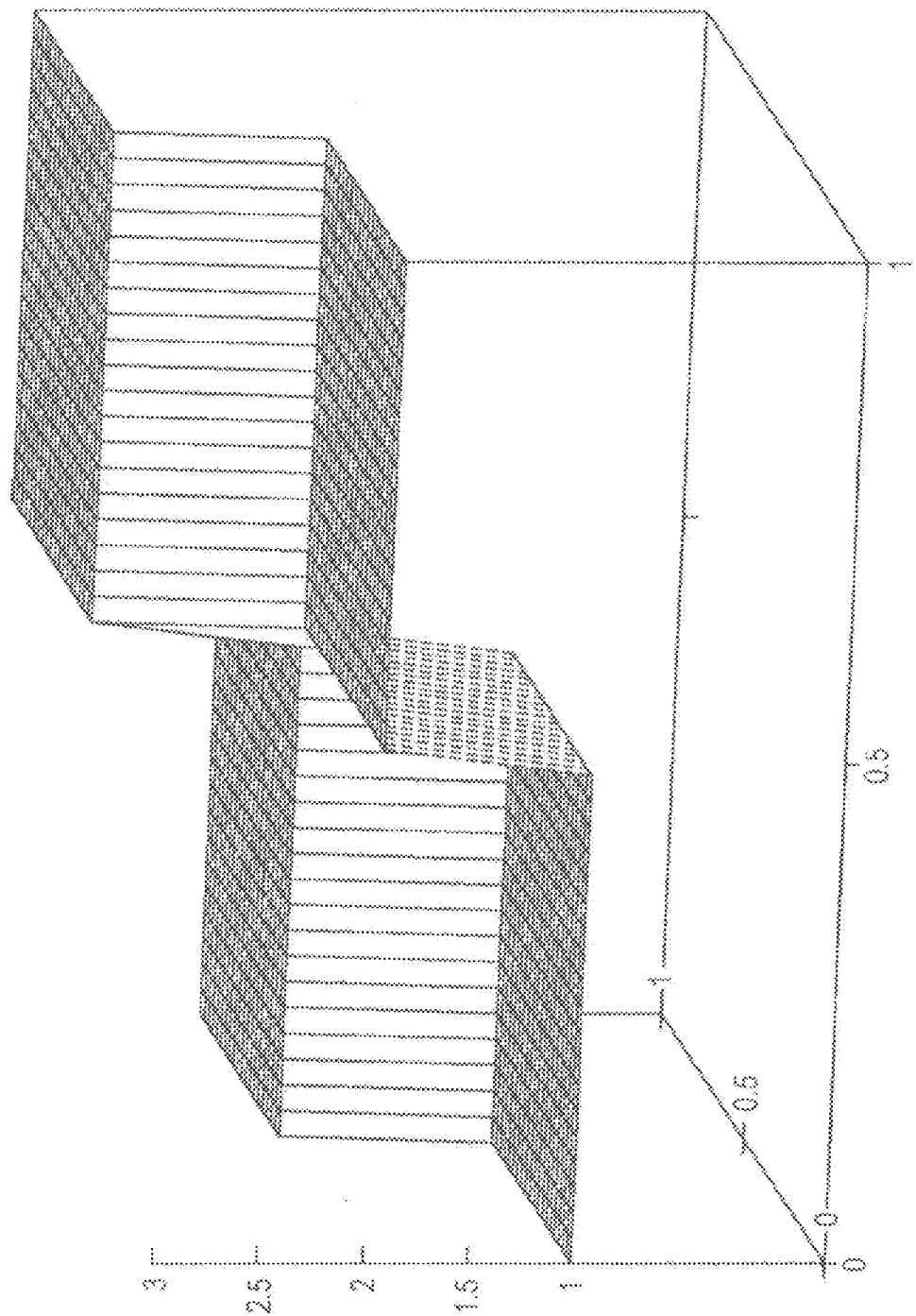
FIG. 21 illustrates an example of a probability density function ψ defined in two dimensions.
Figure 22:
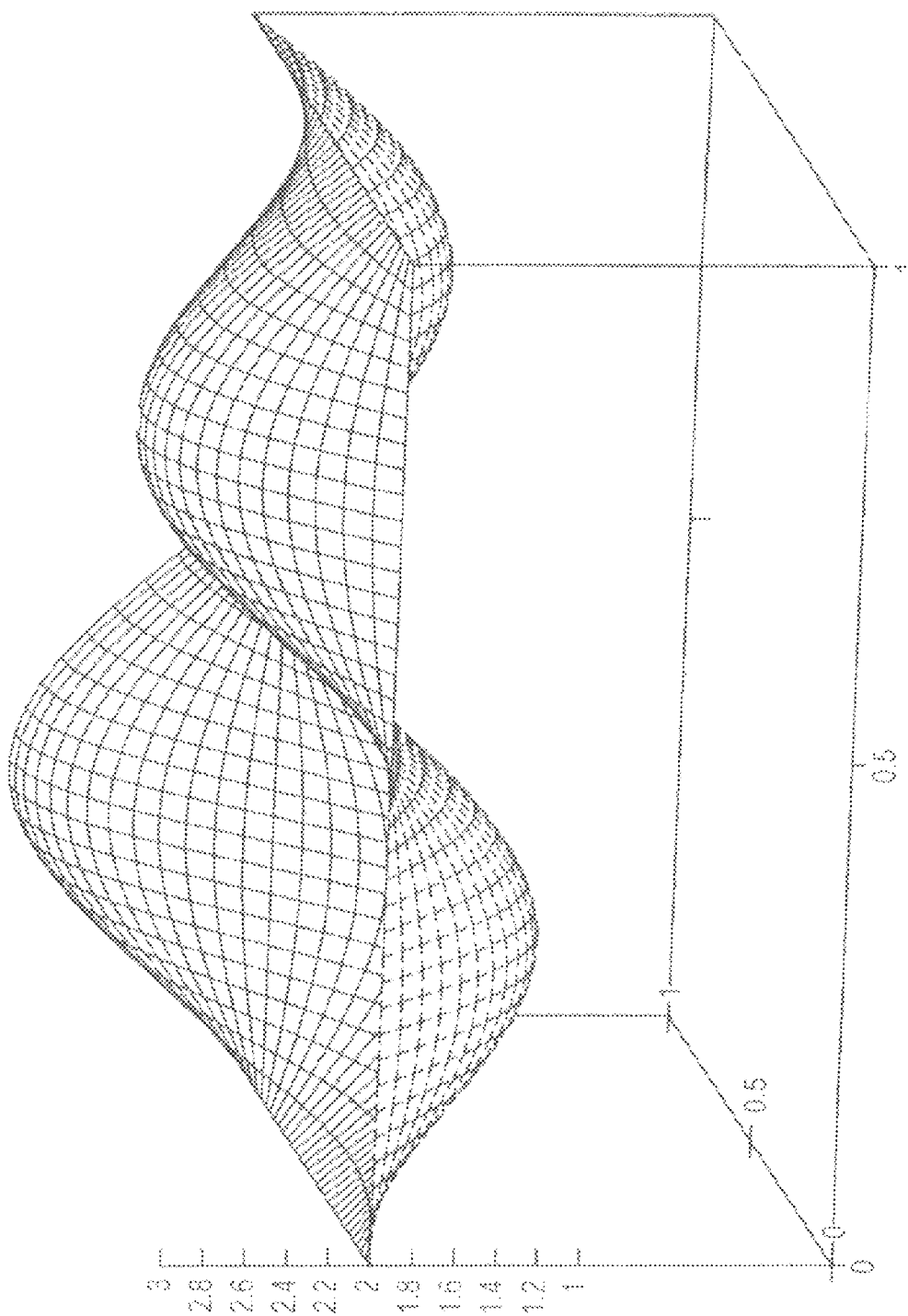
FIG. 22 illustrates another example of the probability density function ψ defined in two dimensions.

FIGS. 21 and 22 illustrate examples of the probability density functions $\psi$ defined in a two-dimensional square. The probability density function $\psi$ may be considered as a demand distribution. A layout of located objects faithfully conforming to $\psi$ is obtained by directly using the specific example 3 and by decreasing energy with the value taken by the function $\phi$ as an energy decrease target limited to two values.

Energy decrease is possible even if the initial image $\phi$ is not defined such that the total sum of the pixel values of the initial image $\phi$ is equal to the total sum of the pixel values of the original image $\psi$. The number of objects to be located (the total number of points in binary image) may be set to be any number n.

Figure 23:
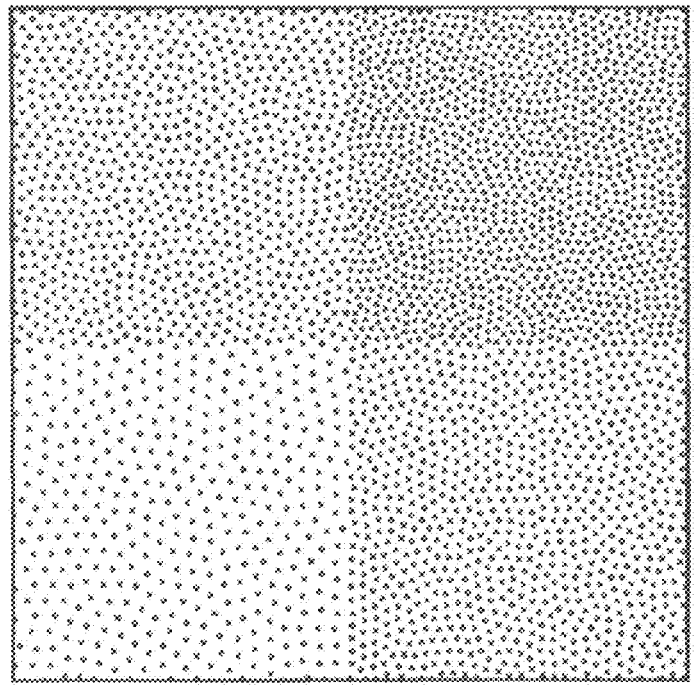
FIG. 23 illustrates an image that is generated by decreasing energy with respect to the original image of FIG. 21 with the values taken by the probability density function φ set to be two values.
Figure 24:
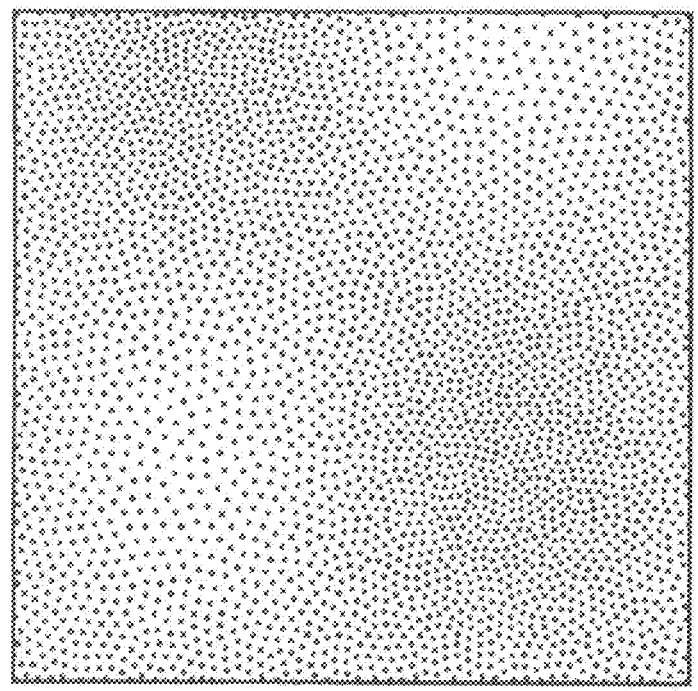
FIG. 24 illustrates an image that is generated by decreasing energy with respect to the original image of FIG. 22 with the values taken by the probability density function φ set to be two values.

FIGS. 23 and 24 illustrate, as examples of images, energy decrease results with n=3200 on the original images of FIGS. 21 and 22. Discrete information (coordinate) data subsequent to energy decrease correspond to a solution to the challenge. As described above, $\psi$ may be any probability density function. No problem arises regardless of whether the distribution changes in a discontinuous fashion as illustrated in FIG. 21 or in a continuous fashion as illustrated in FIG. 22, and it is verified that the layout is performed in a manner faithful to $\psi$.

Figure 25:
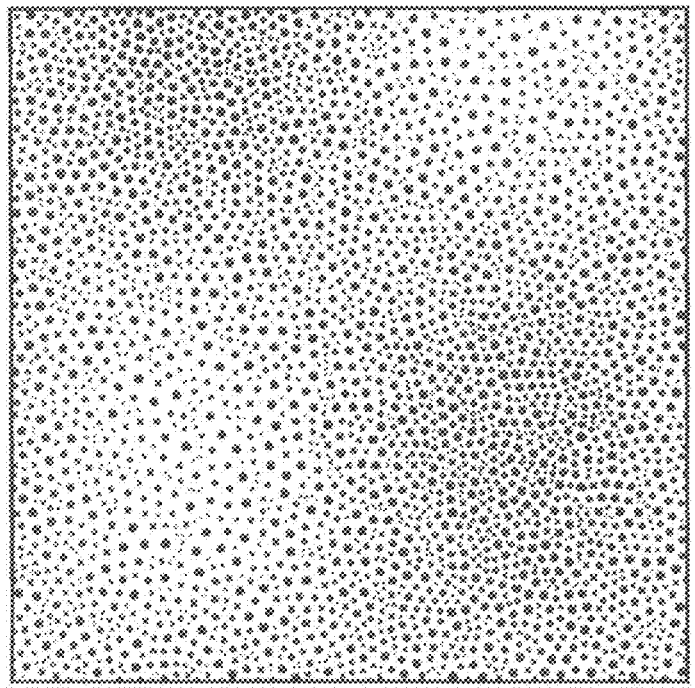
FIG. 25 illustrates an image that is generated by decreasing energy with respect to the original image of FIG. 22 with the values taken by the probability density function φ set to be 10 values.
Figure 26:
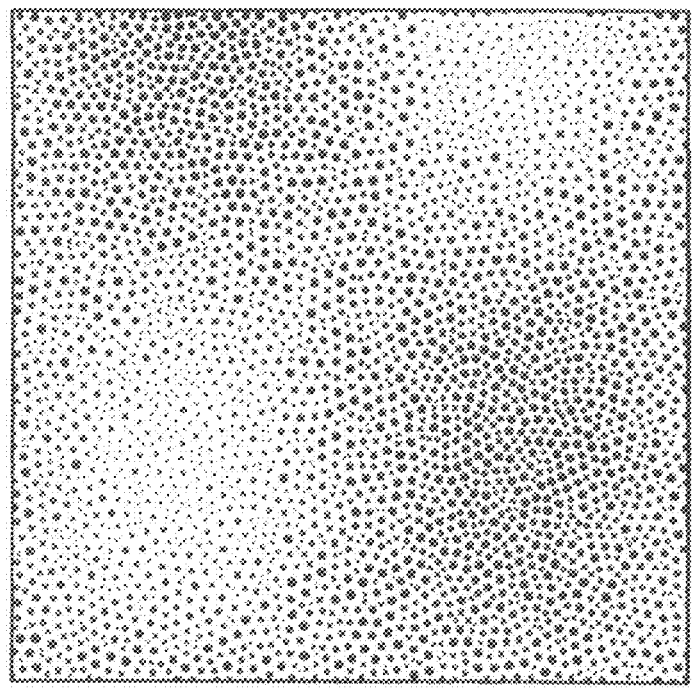
FIG. 26 illustrates an image that is generated by decreasing energy with respect to the original image of FIG. 22 with the values taken by the probability density function φ set to be 10 values wherein the value taken by the probability density function φ is limited to a smaller value of the 10 values within a region of small ψ value.

FIGS. 25 and 26 illustrate, as examples of images, energy decrease results with n=3200 as the number of points located on the original image of FIG. 22 wherein characteristic information such as mass and supply capacity of located objects is treated as the density and size in the specific examples 2 and 3. Referring to FIG. 25, the energy decreasing is performed with the characteristic information of the located objects limited to 10-step (the value taken by the probability density function $\phi$ limited to 10 values). Referring to FIG. 26, the energy decreasing is performed with the same setting as the setting of FIG. 25 and with an appropriate condition that "an object having a small supply capacity is located where a demand is weak" (the value taken by probability density function $\phi$ in an area of small $\psi$ value is limited to a smaller value of the 10 values)."

SPECIFIC EXAMPLE 5

Information Embedding

As described with reference to the specific example 1, energy is set up by determining the weighting function $\omega\psi$ from the original image $\psi$, and the original image $\psi$ is restored by decreasing energy of the image $\phi$. As described with reference to the specific example 2, the constraint is imposed on the value taken by the image $\phi$. The energy decreasing under the constraint causes $\phi$ to converge to an image $\phi$ not matching but sufficiently approximate to the original image $\psi$. The original image $\psi$ is only one, but a large number of images $\phi$ sufficiently approximate to the original image $\psi$ are present. The use of multiple images $\phi$ allows non-degraded information to be embedded in one of the images.

Figure 27:
FIG. 27 illustrates an image that is generated with the values taken by the probability density function φ set to be two values.
Figure 28:
FIG. 28 illustrates an image where dots in a predetermined portion of the image of FIG. 27 are rearranged.
Figure 29:
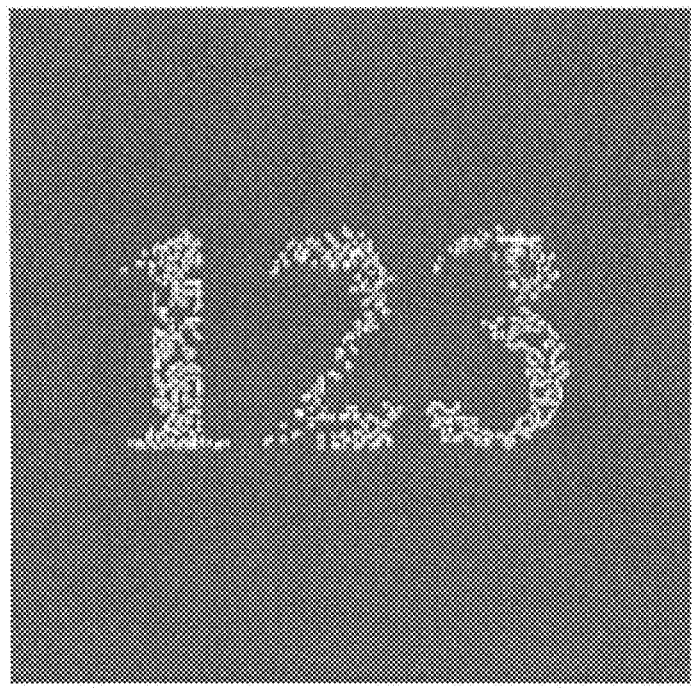
FIG. 29 illustrates an image that results from a difference between the images of FIGS. 27 and 28.

FIG. 27 illustrates an example of an image sufficiently approximate to $\psi$ and resulting from decreasing energy with the value taken by the probability density function $\phi$ limited to two values as described with reference to the specific example 2. Let the image represent image A, and image B is arranged to be embedded as information. Let image A' represent an image that results from randomly vibrating pixel values present in an area corresponding to a logical AND gating of the images A and B. A portion overlapping the image A' and the image B is in a randomly degraded state. The image A' is set to be new $\phi$, and the energy decreasing is performed on only points in A'∩B (all points in A' are the target points of the energy calculation and the energy decreasing targets are limited to A'∩B). In this way, energy of $\phi$ is further decreased, resulting in an image $\phi$ sufficiently approximate to the original image $\psi$. FIG. 28 illustrates the image obtained through this process. As the image of FIG. 27, the image thus obtained sufficiently approximates the original image $\psi$. The images of FIGS. 27 and 28 do not look different to the eyes, but if a difference between the images is calculated, the layout of pixel values in the portion of A'∩B is different as illustrated in FIG. 29. FIG. 27 may be used as an original, and FIG. 28 may be used for distribution. Embedding information as a difference between the two pictures of images may be embedded in related art, but the specific example here is useful in that no image degradation is involved at all because of the use of energy.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A distribution evaluation apparatus comprising:
   at least one processor configured to execute:
   an evaluation value calculating unit that calculates weighted energy as an evaluation value representing distribution of two located objects x and y, by calculating a product resulting from multiplying weighting function values ω(x) and ω(y) of a weighting function ω and probability density function values φ(x) and φ(y) of a probability density function φ representing densities or sizes of the two located objects x and y, by a mutual influence value determined by a function fr having as a variable a distance between the located objects x and y, and then by summing the resulting products with respect to all the located objects x and y into the weighted energy;
   an evaluating unit that evaluates the distribution of the located objects in accordance with the evaluation value calculated by the evaluation value calculating unit to generate an evaluating result; and
   an approximate image generating unit that uses the evaluating result to generate an approximate image approximating an original image.

2. The distribution evaluation apparatus according to claim 1, wherein the weighting function ω is calculated as a weighting function ωψ that is determined in accordance with a probability density function ψ representing a distribution density at a location of each predetermined located object.

3. The distribution evaluation apparatus according to claim 2, wherein the weighting function ωψ is determined such that a weighted potential is a constant with respect to each of the located objects x, wherein the weighted potential is calculated by multiplying the mutual influence value by the weighting function values ω(x) and ω(y) and the probability density function value ψ(y) into a product and by summing the resulting products with respect to all the located objects y.

4. The distribution evaluation apparatus according to claim 3, wherein the function fr has a value of zero if the distance between the two located objects x and y exceeds a predetermined distance limit, wherein the function fr is a convex function if the distance between the two located objects x and y is equal to or shorter than the predetermined distance limit, and wherein the convex function, having a distance value as a variable, monotonically decreases and is twice differentiable.

5. The distribution evaluation apparatus according to claim 2, wherein the function fr has a value of zero if the distance between the two located objects x and y exceeds a predetermined distance limit, wherein the function fr is a convex function if the distance between the two located objects x and y is equal to or shorter than the predetermined distance limit, and wherein the convex function, having a distance value as a variable, monotonically decreases and is twice differentiable.

6. The distribution evaluation apparatus according to claim 5, wherein the evaluation value calculating unit skips the summing operation on the two located objects x and y if the distance between the two located objects x and y exceeds the predetermined distance limit.

7. The distribution evaluation apparatus according to claim 1, wherein the function fr has a value of zero if the distance between the two located objects x and y exceeds a predetermined distance limit, wherein the function fr is a convex function if the distance between the two located objects x and y is equal to or shorter than the predetermined distance limit, and wherein the convex function, having a distance value as a variable, monotonically decreases and is twice differentiable.

8. The distribution evaluation apparatus according to claim 7, wherein the evaluation value calculating unit skips the summing operation on the two located objects x and y if the distance between the two located objects x and y exceeds the predetermined distance limit.

9. A distribution determining apparatus comprising:
   at least one processor configured to execute:
   an evaluation value calculating unit that calculates weighted energy as an evaluation value representing a degree of approximation between a given probability density function ψ and a probability density function φ, by calculating a product resulting from multiplying weighting function values ωψ(x) and ωψ(y) determined by the probability density function ψ and probability density function values φ(x) and φ(y) representing densities or sizes of two located objects x and y, by a mutual influence value determined by a function fr having as a variable a distance between the located objects x and y, and then by summing the resulting products with respect to all the located objects x and y into the weighted energy;
   a distribution determining unit that determines the value φ of the probability density function φ in accordance with the evaluation value calculated by the evaluation value calculating unit such that the weighted energy decreases; and
   an approximate image generating unit that uses the determined φ value of the probability density function φ to generate an approximate image approximating an original image.

10. The distribution determining apparatus according to claim 9, wherein the distribution determining unit interchanges, in an interchange operation, density φ values or size φ values by any amount between located objects u and v such that the weighted energy decreases, and iterates the interchange operation by a predetermined number of times to decrease the weighted energy.

11. The distribution determining apparatus according to claim 10, wherein an amount of decrease in the weighted energy is defined as an amount of weighted energy decrease that includes only a term that affects a variation in the weighted energy responsive to an interchange of the density or the size of the located object when the density φ values or size φ values are interchanged by any amount between the located objects u and v.

12. The distribution determining apparatus according to claim 11, wherein in the interchange operation of the density φ value or the size φ value of the located objects, the distribution determining unit interchanges the density φ value or the size φ value of the located objects under a predetermined constraint set in the density or the size the located object is permitted to take.

13. An image processing apparatus comprising:
    at least one processor configured to execute:
    an evaluation value calculating unit that calculates weighted energy as an evaluation value representing a degree of approximation between a given probability density function ψ and a probability density function φ, by calculating a product resulting from multiplying weighting function values ωψ(x) and ωψ(y) determined by the probability density function ψ and probability density function values φ(x) and φ(y) representing densities or sizes of two points x and y, by a mutual influence value determined by a function fr having as a variable a distance between the two points x and y, the two points x and y forming an image, and then by summing the resulting products with respect to all the points x and y into the weighted energy;

a distribution determining unit that determines the $\phi$ value of the probability density function $\phi$ in accordance with the evaluation value calculated by the evaluation value calculating unit such that the weighted energy decreases; and an approximate image generating unit that uses the determined $\phi$ value of the probability density function $\phi$ to generate an approximate image approximating an original image.

14. The image processing apparatus according to claim 13, wherein the distribution determining unit interchanges the density or the size by a predetermined amount in an interchange operation for weighted energy decreasing, and decreases the weighted energy by iterating the interchange operation on all points by a predetermined number of times in order to restore the approximate image to the original image, the original image being represented by the probability density function $\psi$, and embeds, as information, a difference between two approximate images restored.

15. A distribution evaluation method comprising:

calculating, by at least one processor, weighted energy as an evaluation value representing distribution of two located objects x and y, by calculating a product resulting from multiplying weighting function values $\omega(x)$ and $\omega(y)$ and probability density function values $\phi(x)$ and $\phi(y)$ representing densities or sizes of the located objects x and y, by a mutual influence value determined by a function fr having as a variable a distance between the located objects x and y, and then by summing the resulting products with respect to all the located objects x and y into the weighted energy;

evaluating, by the at least one processor, the distribution of the located objects in accordance with the calculated evaluation value to generate an evaluating result; and using, by the at least one processor, the evaluating result to generate an approximate image approximating an original image.

16. A distribution determining method comprising:

calculating, by at least one processor, weighted energy as an evaluation value representing a degree of approximation between a given probability density function $\psi$ and a probability density function $\phi$, by calculating a product resulting from multiplying weighting function values $\omega\psi(x)$ and $\omega\psi(y)$ determined by the probability density function $\psi$ and probability density function values $\phi(x)$ and $\phi(y)$ representing densities or sizes of two located objects x and y, by a mutual influence value determined by a function fr having as a variable a distance between the located objects x and y, and then by summing the resulting products with respect to all the located objects x and y into the weighted energy;

determining, by the at least one processor, the $\phi$ value of the probability density function $\phi$ in accordance with the calculated evaluation value such that the weighted energy decreases; and using, by the at least one processor, the determined $\phi$ value of the probability density function $\phi$ to generate an approximate image approximating an original image.

17. An image processing method comprising:

calculating, by at least one processor, weighted energy as an evaluation value representing a degree of approximation between a given probability density functions $\psi$ and a probability density function $\phi$, by calculating a product resulting from multiplying weighting function values $\omega\psi(x)$ and $\omega\psi(y)$ determined by the probability density function $\psi$ and probability density function values $\phi(x)$ and $\phi(y)$ representing densities or sizes of two points x and y, by a mutual influence value determined by a function fr having as a variable a distance between the points x and y, the points x and Y forming an image, and then by summing the resulting products with respect to all the points x and y into the weighted energy;

determining, by the at least one processor, the $\phi$ value of the probability density function $\phi$ in accordance with the calculated evaluation value such that the weighted energy decreases; and using, by the at least one processor, the determined $\phi$ value of the probability density function $\phi$ to generate an approximate image approximating an original image.

18. A non-transitory computer readable medium storing a program causing a computer to execute a process for evaluating distribution of two located objects, the process comprising:

calculating weighted energy as an evaluation value representing a degree of approximation between a given probability density function $\psi$ and a probability density function $\phi$, by calculating a product resulting from multiplying weighting function values $\omega\psi(x)$ and $\omega\psi(y)$ determined by the probability density function $\psi$ and probability density function values $\phi(x)$ and $\phi(y)$ representing densities or sizes of two located objects x and y, by a mutual influence value determined by a function fr having as a variable a distance between the located objects x and y, and then by summing the resulting products with respect to all the located objects x and y into the weighted energy;

evaluating the degree of approximation between the probability density functions $\psi$ and $\phi$ in accordance with the calculated evaluation value to generate an evaluating result; and using the evaluating result to generate an approximate image approximating an original image.

19. A non-transitory computer readable medium storing a program causing a computer to execute a process for determining an evaluation value, the process comprising:

calculating weighted energy as an evaluation value representing a degree of approximation between a given probability density function $\psi$ and a probability density function $\phi$, by calculating a product resulting from multiplying weighting function values $\omega\psi(x)$ and $\omega\psi(y)$ determined by the probability density function $\psi$ and probability density function values $\phi(x)$ and $\phi(y)$ representing densities or sizes of two located objects x and y, by a mutual influence value determined by a function fr having as a variable a distance between the located objects x and y, and then by summing the resulting products with respect to all the located objects x and y into the weighted energy;

determining the $\phi$ value of the probability density function $\phi$ in accordance with the calculated evaluation value such that the weighted energy decreases; and using the determined $\phi$ value of the probability density function $\phi$ to generate an approximate image approximating an original image.

20. A non-transitory computer readable medium storing a program causing a computer to execute a process for processing an image, the process comprising:

calculating weighted energy as an evaluation value representing a degree of approximation between a given probability density function $\psi$ and a probability density function $\phi$, by calculating a product resulting from multiplying weighting function values $\omega\psi(x)$ and $\omega\psi(y)$ determined by the probability density function $\psi$ and probability density function values $\phi(x)$ and $\phi(y)$ representing densities or sizes of two points x and y, the two points x and y forming an image, by a mutual influence value determined by a function fr having as a variable a distance between the two points x and y, and then by summing the resulting products with respect to all the points x and y into the weighted energy;

determining the $\phi$ value of the probability density function $\phi$ in accordance with the calculated evaluation value such that the weighted energy decreases; and using the determined $\phi$ value of the probability density function to generate an approximate image approximating an original image.

* * * * *